Feb. 1, 1927.
H. ROBICHAUX
1,616,334
ANIMAL TRAP
Filed Oct. 22, 1926     3 Sheets-Sheet 1
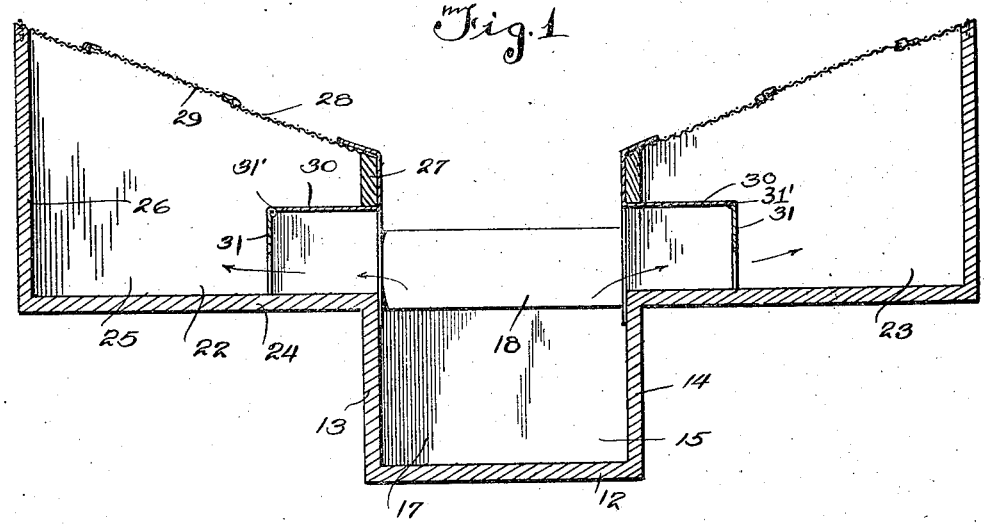
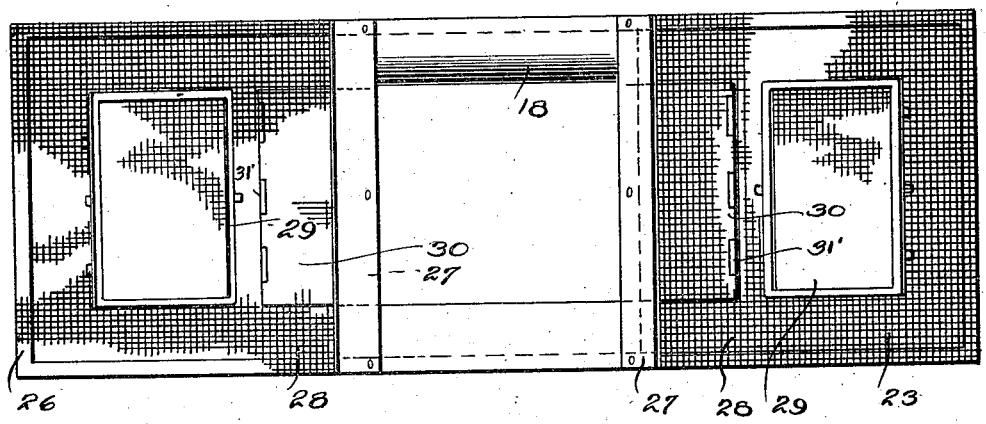
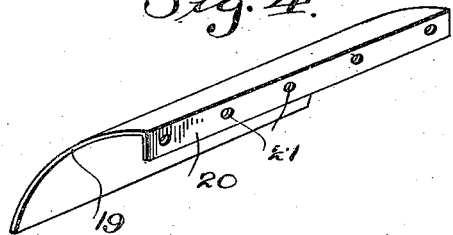
Inventor
H. Robichaux
by
Wilkinson & Giusta
Attorneys Feb. 1, 1927.
1,616,334
H. ROBICHAUX
ANIMAL TRAP
Filed Oct. 22, 1926    3 Sheets-Sheet 2
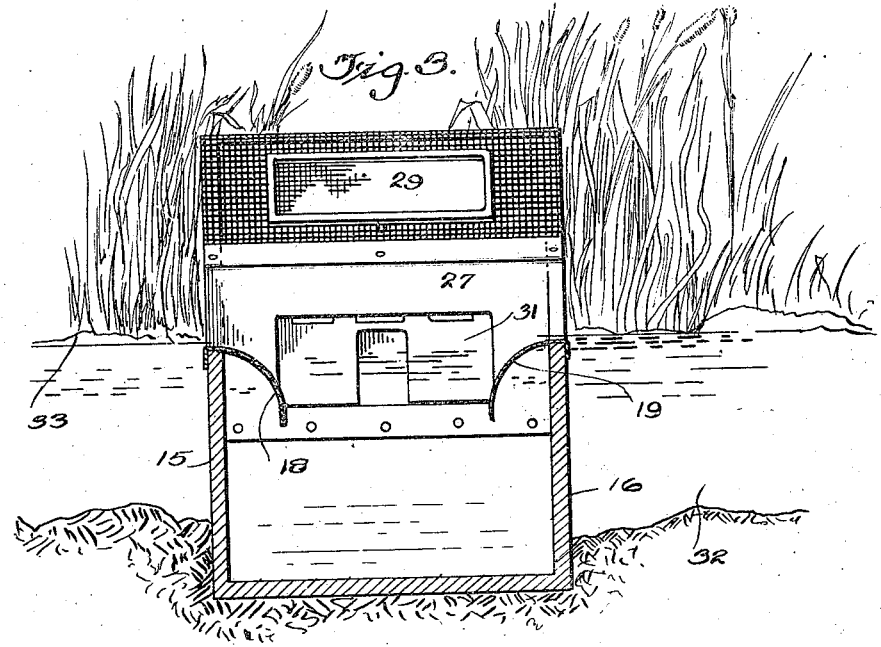
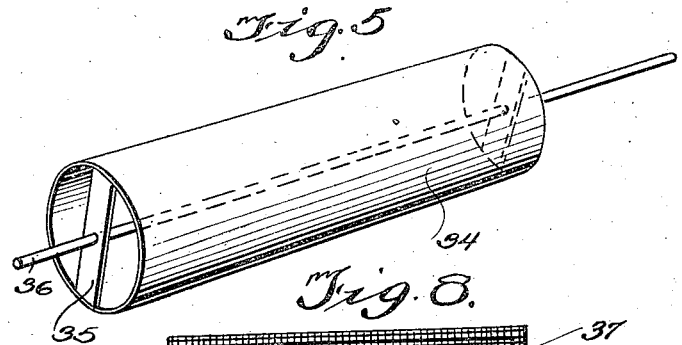
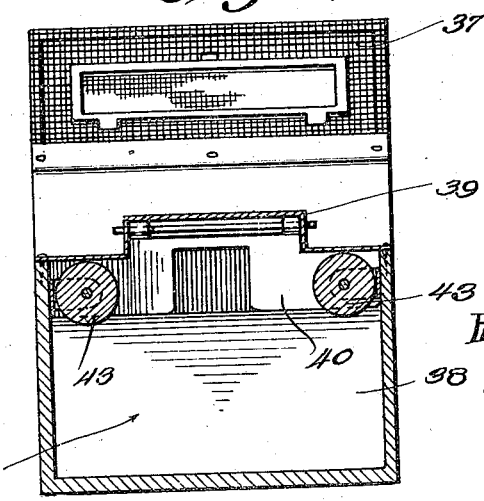
Inventor
H. Robichaux
by
Wilkinson & Giusta
Attorneys Feb. 1, 1927.
H. ROBICHAUX
ANIMAL TRAP
Filed Oct. 22, 1926    3 Sheets-Sheet 3
1,616,334
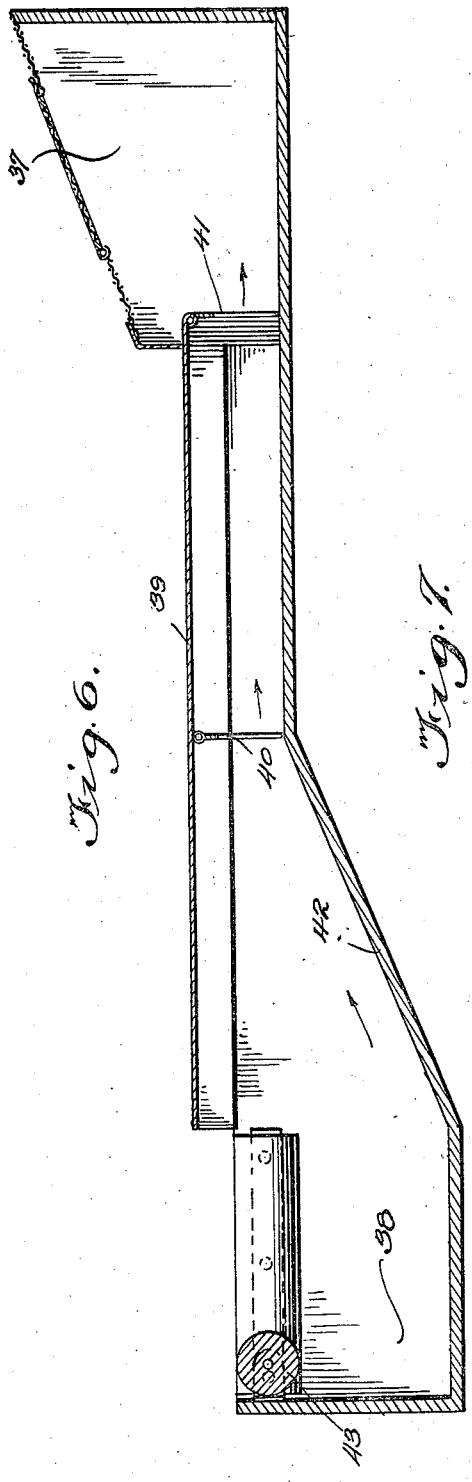
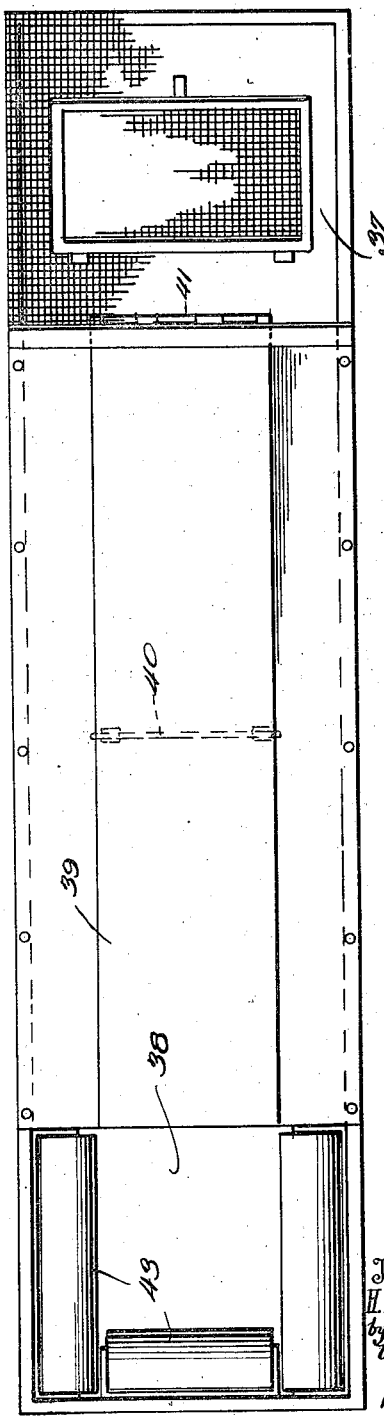
Inventor
H. Robichaux
by Wilkinson &
Giusta
Attorneys.

Patented Feb. 1, 1927.

1,616,334

UNITED STATES PATENT OFFICE.

HERMOGENE ROBICHAUX, OF FRANKLIN, LOUISIANA.

ANIMAL TRAP.

Application filed October 22, 1926. Serial No. 143,446.

The present invention relates to improvements in animal traps and has for an object to provide an improved trap constructed with a view to taking advantage of the habits of muskrats and other animals by which to enable their convenient capture alive in great numbers.

Another object of the invention is to provide a trap construction which will be simple and inexpensive and which is constructed with a view to its concealment from the animals.

With the foregoing and other objects in view, the invention will be described in detail in connection with the accompanying drawings in which like reference symbols denote like parts throughout the several views, and in which—

Figure 1 is a longitudinal central section taken through a trap constructed according to the present invention;

Figure 2 is a top plan view of the same;

Figure 3 is a transverse central sectional view;

Figure 4 is a perspective view of one of the slide plates;

Figure 5 is a perspective view showing a roller construction as a modification for the slide plate;

Figure 6 is a longitudinal section taken through a modified form of trap;

Figure 7 is a top plan view of the same; and

Figure 8 is a transverse central section therethrough.

Referring more particularly to the drawings, 12 designates the base or bottom; 13 and 14, the end walls, and 15 and 16, the side walls of a capture pit 17 adapted to be sunk below the runway or surface of the ground and into which the animals are to be precipitated.

The side walls 15 and 16, as shown in Figure 3, are provided with slide plates 18 and 19 of metal or other appropriate construction and preferably of the curved form shown in Figures 3 and 4. Such plates are made with the upper depending flanges 20 perforated as shown at 21 for convenience in receiving nails or other fastening means by which the slide plates are secured to the upper ends of the side walls 15 and 16. The arrangement is such that the flanges 20 lie against the external faces of the side walls while the upper edges of said side walls receive the portions of the slide plates adjacent the flanges and thus serve to support the plates and take the strain off the fastening means. The slide plates curve or incline downwardly and inwardly with respect to the sunken pit 17 and in the use of the trap for the capture of muskrats, the slime or mire in the territory inhabited by these animals will serve to maintain the smooth convex surfaces of the slide plates very slippery so that while a wide mouth is provided at the upper end of the pit for the entrance of the animals, the slide plates with their lower, exceedingly thin edges and slippery convex surfaces offer no opportunity for the subsequent escape of the imprisoned animals.

In order to avoid the drowning of the animals in the pit 17 which is normally submerged under water and mire, one or more prison compartments 22 and 23 are provided with entrances just above the end walls 13 and 14. Each prison compartment is shown as confined within a bottom or floor 24 with side walls 25 erected thereon, an outer wall 26 and an inner wall 27. The inner wall is preferably lower than the outer wall 26 and the upper portion of the compartment may be covered over with a wire screen 28 to afford light to the compartment. A door 29 may be provided in the roof as shown in Figure 3, through which the animals may be removed as by the use of appropriate implements. The inner walls 27 are provided with openings as shown in Figures 1 and 3 which openings may be rectangular or of other form and which extend between the slide plates 18 and 19. With these openings communicate tubes or passages 30 having at their inner ends doors 31 pivotally hung as at 31' and adapted to close by gravity so that while opening freely to admit the animals to the compartments, these doors will prevent the subsequent escape of the animals through the entrance tubes 30.

In the use of the device, the pit 17 is adapted to be sunk to an appropriate depth in a runway such as indicated at 32 in Figure 3. These runways are commonly made by the muskrat for the purpose of getting from its mound to the feeding place and such runways contain water up to the level, for instance, indicated at 33 in Figure 3. The pit is preferably emersed to the depth shown in this Figure 3 with the water level extending slightly above the slide plates so that the pit is obscured by the water. The two prison compartments 22 and 23 will extend to opposite sides of the runway and may be concealed by brush, grass, or the like. The inner walls 27 of the prison compartments will form continuations of the side banks of the runways and they will compel the animals to follow a course carrying them directly over the pit 17, the mouth of which will be arranged of such size as to prevent the animals bridging same when swimming or otherwise progressing along such runways. When the animals fall into the pit, their claws will slide upon the slide plates and prevent them from making their way out of the trap and again into the runway, but at the same time it will be comparatively easy for them to enter either prison compartment 22 or 23 through the tubes and swinging-doors provided. When once in the compartments the animals will be held substantially above the water line so as to prevent drowning and no injury will be done the fur for which these animals are so valuable. From time to time the animals may be removed through the doors 29 of the prison compartments.

Referring now to Figure 5, I have herein shown a roller or cylinder 34 made of sheet metal or other appropriate material and preferably of hollow construction with the diametrically extending cross pieces 35 at its ends which cross pieces are perforated axially of the cylinder to receive the shaft or pin 36. Two such cylinders are employed as shown in Figure 8 in positions corresponding to those occupied by the slide plates 18 and 19 in Figure 3. The cylinders will also present smooth and slick surfaces and additionally, such cylinders will rotate with the weight of the animal imposed thereon. As a consequence, the animal will be more quickly precipitated into the pit and will be more securely imprisoned therein by the use of such rotating cylinders.

Now referring more particularly to Figures 6, 7 and 8, the trap construction therein shown is devised with a view to removing the prison compartment 37, which may be constructed in any appropriate manner as, for instance, in the manner previously described of the prison compartments 22 and 23 as far as possible from the point of capture of the animals, whereby to avoid dissuading the animals from entering the pit because of the proximity of imprisoned animals. Moreover, the prison compartment 37 may be concealed to better advantage at a remote point. Although more than one such remote prison compartment may be placed in connection with the pit, I have shown only one such compartment by way of example and place this compartment in communication with the sunken pit 38 by a long enclosed passage-way 39 preferably having the two swinging-doors or gates 40 and 41 therein arranged to open toward the prison compartment but prevented from swinging toward the pit. These doors 40 and 41 are preferably spaced apart, the door 41 being rotated adjacent the prison compartment while the initial door 40 may be placed at the upper end of the inclined wall 42 which in effect constitutes one of the end walls of the pit. The inclined wall 42 enables the animals to ascend to a higher zone where they will be saved from drowning.

In Figures 6, 7 and 8 there is additionally shown a small cylinder 43 similar in construction to the cylinders 34 and performing a like function at the end wall of the pit which is unconnected with any prison compartment. This cylinder 43 prevents the escape of the animals in this direction and with the side cylinders 34 closes all escape to the animal from the pit except by way of the prison compartment 37.

This trap may be enlarged in accordance with the nature of the animals to be caught and while with muskrats either the slide plates 18 and 19, shown in Figures 1 to 4 inclusive, or the cylinder 5 may be useful, with some animals the plates will be more effective and with other animals the cylinders are to be preferred. It is to be understood, however, that either the plates or the cylinders may be used.

It will be obvious that many changes in the construction, combination and arrangement of parts could be made, which could be used without departing from the spirit of my invention, and I do not mean to limit the invention to such details, except as particularly pointed out in the claims.

Having thus described my invention, what I claim and desire to secure by Letters Patent of the United States is:—

1. An animal trap for amphibious animals comprising a downwardly projecting pit open at the top and adapted to be submerged in the animal's runway, the said pit having side walls to form a passage for the animals between the same, with slippery deflectors mounted at opposite ends of the pit between said side walls and projecting over the ends of said pit, the said deflectors being normally beneath the surface of the water, so as to prevent the animal from climbing over same out of the water, with perforations in said side walls, elevated prison compartments connected by passages to said perforations, and swing doors opening inwards into said prison compartments, but held against opening in the reverse direction, substantially as and for the purposes described.

2. An animal trap for amphibious animals, comprising a downwardly projecting pit open at the top and adapted to be submerged in the animal's runway, the said pit having side walls to form a passage for the animals between the same, with slippery deflectors mounted at opposite ends of said pit between said side walls and projecting over the ends of said pit, the said deflectors being normally beneath the surface of the water, so as to prevent the animal from climbing over same out of the water, with a perforation in one of said side walls, an elevated prison compartment connected by a passage to said perforation, and a swing door opening inwards into said prison compartment, but held against opening in the reverse direction, substantially as and for the purposes described.

3. An animal trap for amphibious animals, comprising a downwardly projecting pit open at the top and adapted to be submerged in the animal's runway, the said pit having side walls to form a passage for the animals between the same, with downwardly curved plates adapted to be hidden beneath the water and to form slippery deflectors, mounted between said side walls and projecting downwardly over the ends of said pit, so as to prevent the animal from climbing over same out of the water, with perforations in said side walls, elevated prison compartments connected by passages to said perforations, and swing doors opening inwards into said prison compartments, but held against opening in the reverse direction, substantially as and for the purposes described.

4. An animal trap comprising a pit adapted to be submerged in the animal's runway with an upper open mouth spaced below the water level, convex plates supported by the side walls and having external flanges secured to the outside surfaces of said side walls, said plates extending inwardly and downwardly with respect to the pit, and a prison compartment communicating with the pit between said convex plates.

HERMOGENE ROBICHAUX.